(12) United States Patent  
Minamisawa et al.

(10) Patent No.: US 9,291,832 B2  
(45) Date of Patent: Mar. 22, 2016

(54) OPTICAL UNIT WITH SHAKE CORRECTING FUNCTION WITH FLEXIBLE CIRCUIT BOARD HAVING FOLDED-BACK PORTIONS

(75) Inventors: Shinji Minamisawa, Nagano (JP); Hisahiro Ishihara, Nagano (JP); Tatsuki Wade, Nagano (JP); Katsushige Yanagisawa, Nagano (JP); Shinroku Asakawa, Nagano (JP); Yoshihiro Hamada, Nagano (JP); Toshiyuki Karasawa, Nagano (JP)

(73) Assignee: NIDEC SANKYO CORPORATION (JP)

( * ) Notice: Subject to any disclaimer, the term of this patent is extended or adjusted under 35 U.S.C. 154(b) by 615 days.

(21) Appl. No.: 13/635,140

(22) PCT Filed: Apr. 18, 2011

(86) PCT No.: PCT/JP2011/059504  
§ 371 (c)(1),  
(2), (4) Date: Sep. 14, 2012

(87) PCT Pub. No.: WO2011/136067  
PCT Pub. Date: Nov. 3, 2011

(65) Prior Publication Data  
US 2013/0182325 A1    Jul. 18, 2013

(30) Foreign Application Priority Data  
Apr. 30, 2010   (JP) ................................. 2010-105638

(51) Int. Cl.  
*G02B 27/64* (2006.01)  
*G03B 5/00* (2006.01)  
*H04N 5/232* (2006.01)

(52) U.S. Cl.  
CPC ................ *G02B 27/646* (2013.01); *G03B 5/00* (2013.01); *H04N 5/23248* (2013.01); *G03B 2205/0015* (2013.01); *G03B 2205/0023* (2013.01); *G03B 2205/0069* (2013.01)

(58) Field of Classification Search  
None  
See application file for complete search history.

(56) References Cited

U.S. PATENT DOCUMENTS

| | | | |
|---|---|---|---|
| 5,602,675 A * | 2/1997 | Okada | 359/554 |
| 6,714,360 B2 * | 3/2004 | Kawanabe | 359/704 |
| 2010/0091120 A1 * | 4/2010 | Nagata et al. | 348/208.4 |

FOREIGN PATENT DOCUMENTS

| | | |
|---|---|---|
| JP | 8-304868 A | 11/1996 |
| JP | 9-80516 A | 3/1997 |
| JP | 2009-239536 A | 10/2009 |
| JP | 2009-294393 A | 12/2009 |
| WO | WO 2009133690 A1 * | 11/2009 |

OTHER PUBLICATIONS

International Search Report for International Application No. PCT/JP2011/059504, mailed Jul. 12, 2011, with English translation.

* cited by examiner

*Primary Examiner* — Arnel C Lavarias  
(74) *Attorney, Agent, or Firm* — Cantor Colburn LLP

(57) ABSTRACT

Provided is an optical unit with shake correction function wherein it is possible to accurately swing the movable module even when a flexible wiring substrate is connected to the fixing element and movable module. In an optical unit with shake correction function, folding portions, the extending direction of which is reversed towards the vicinity of the swinging support point of a movable module, are provided at the midway portion of a flexible wiring substrate that is connected to the movable module and to a fixing element. In the folding portions, the overlapping portions of the flexible wiring substrate are fixed.

10 Claims, 13 Drawing Sheets

OPTICAL UNIT WITH SHAKE CORRECTING FUNCTION WITH FLEXIBLE CIRCUIT BOARD HAVING FOLDED-BACK PORTIONS

CROSS REFERENCE TO RELATED APPLICATIONS

This is a U.S. national stage of International Application No. PCT/JP2011/059504, filed on Apr. 18, 2011. Priority under 35 U.S.C. §119(a) and 35 U.S.C. §365(b) is claimed from Japanese Application No. 2010-105638, filed Apr. 30, 2010, the disclosures of which are also incorporated herein by reference.

TECHNICAL FIELD

The present invention relates to an optical unit with a shake correcting function which is mounted on a cell phone with a camera or the like.

BACKGROUND

In an optical unit for photographing which is mounted on a digital camera, a cell phone or the like, it is preferable to restrain disturbance of a photographed image due to a hand shake of a user. Therefore, in a digital camera and the like, a technique has been proposed in which optical elements such as a lens and an imaging element are mounted in a movable module which is capable of being swung with respect to a fixed body and the movable module is swung by a movable module drive mechanism for shake correction. In this technique, a flexible circuit board for supplying power to the imaging element and a lens drive mechanism and for outputting a signal from the imaging element is connected with the movable module and the flexible circuit board is also connected with the fixed body. Therefore, the flexible circuit board is deformed when the movable module is swung and thus, rigidity and a shape restoring force of the flexible circuit board may disturb the swing of the movable module.

In order to prevent the problem, a structure has been proposed in which the flexible circuit board is curved or bent to reduce the rigidity and the shape restoring force of the flexible circuit board so that a force applied to the movable module by the flexible circuit board is reduced (see Patent Literatures 1 through 3).

[PTL 1] Japanese Patent Laid-Open No. 2009-294393
[PTL 2] Japanese Patent Laid-Open No. 2009-239536
[PTL 3] Japanese Patent Laid-Open No. Hei 9-80516

However, when the structure in which the flexible circuit board is curved or bent is adopted, an effect applied to the movable module by the flexible circuit board is varied due to a degree of curvature and a degree of bending and thus the movable module is not swung with a high degree of accuracy. Further, when the structure in which the flexible circuit board is curved or bent is adopted, the degree of curvature and the degree of bending are changed with a lapse of time and the effect applied to the movable module by the flexible circuit board is varied and, as a result, the movable module is not swung with a high degree of accuracy.

SUMMARY

In view of the problem described above, at least an embodiment of the present invention provides an optical unit with a shake correcting function in which the movable module is capable of being swung with a high degree of accuracy even when a flexible circuit board is connected with the fixed body and the movable module.

In order to attain the above, at least an embodiment of the present invention provides an optical unit with a shake correcting function including a fixed body, a movable module which holds an optical element, a flexible circuit board which is connected with the movable module and the fixed body, and a movable module drive mechanism for shake correction which swings the movable module with respect to the fixed body. The flexible circuit board is provided with a folded-back portion whose extended direction is reversed at a midway portion from a connected portion with the fixed body to a connected portion with the movable module, and portions of the folded-back portion which are superposed on each other are fixed to each other.

In at least an embodiment of the present invention, the flexible circuit board which is connected with the fixed body and the movable module is provided with a folded-back portion whose extended direction is reversed at a midway portion from a connected portion with the fixed body to a connected portion with the movable module, and portions of the folded-back portion which are superposed on each other are fixed to each other. Therefore, even when a structure is adopted in which the rigidity and the shape restoring force of the flexible circuit board is weakened through the folded-back portion, the degree of bending of the folded-back portion is not varied in an initial state or with a lapse of time. Accordingly, since an effect applied to the movable module by the flexible circuit board is prevented from being varied, the movable module is swung with a high degree of accuracy.

In at least an embodiment of the present invention, it may be structured that the portions of the folded-back portion which are superposed on each other are fixed to each other by a joining member which joins faces facing each other of the folded-back portion. According to this structure, the portions superposed on each other of the folded-back portion are fixed to each other on an inner side of the folded-back portion and thus space saving is attained.

In at least an embodiment of the present invention, it is preferable that the joining member is a thermosetting adhesive sheet. According to this structure, after the thermosetting adhesive sheet is interposed on the inner sides of the folded-back portion, when the thermosetting adhesive sheet is cured, the faces facing each other are fixed to each other in the folded-back portion.

In at least an embodiment of the present invention, it may be structured that the joining member is solder for joining metal patterns which are formed on faces facing each other of the folded-back portion. The flexible circuit board is electrically connected by soldering and thus, when the soldering work is additionally performed on the folded-back portion, the portions superposed on each other of the folded-back portion are fixed to each other.

In at least an embodiment of the present invention, it may be structured that the portions of the folded-back portion which are superposed on each other are fixed to each other by a restricting member which sandwiches and restricts the folded-back portion from its outer side. According to this structure, the restricting member is comparatively easily detached and thus repair and disassembling are easily performed.

In at least an embodiment of the present invention, it is preferable that the restricting member is a clip which is provided with a hole into which the folded-back portion is inserted.

In at least an embodiment of the present invention, the restricting member may be a heat-shrinkable member formed in a ring shape into which the folded-back portion is inserted.

In at least an embodiment of the present invention, it is preferable that a swing support point for swinging the movable module is provided between the fixed body and the movable module on a side where the folded-back portion is located. According to this structure, a deformed quantity of the flexible circuit board when the movable module is swung is restrained small. Therefore, an effect applied to the movable module by the flexible circuit board is reduced and thus the movable module can be swung with a high degree of accuracy.

In at least an embodiment of the present invention, it is preferable that the folded-back portion is divided in a direction intersecting an extended direction of the flexible circuit board so as to be extended on both sides of the swing support point. According to this structure, the swing support point can be provided on the side where the folded-back portion is located. Further, since the width of the divided flexible circuit board is narrowed, the rigidity and the shape restoring force of the flexible circuit board is weakened.

In at least an embodiment of the present invention, it is preferable that the folded-back portion and a swing center of the swing support point are located at the same height position as each other in an optical axis direction. According to this structure, displacement of the folded-back portion is restrained small. Therefore, an effect applied to the movable module by the flexible circuit board is reduced and thus the movable module can be swung with a high degree of accuracy.

In at least an embodiment of the present invention, the flexible circuit board which is connected with the fixed body and the movable module is provided with a folded-back portion whose extended direction is reversed at a midway portion from a connected portion with the fixed body to a connected portion with the movable module, and portions of the folded-back portion which are superposed on each other are fixed to each other. Therefore, even when a structure is adopted in which the rigidity and the shape restoring force of the flexible circuit board is weakened by the folded-back portion, the degree of bending of the folded-back portion is not varied in an initial state or with a lapse of time. Accordingly, since an effect applied to the movable module by the flexible circuit board is prevented from being varied, the movable module is swung with a high degree of accuracy.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 1 is an explanatory view schematically showing a state in which an optical unit with a shake correcting function to which the present invention is applied is mounted on an optical device such as a cell phone or the like.

DESCRIPTION OF EMBODIMENTS

Embodiments of the present invention will be described below with reference to the accompanying drawings.

In the following description, a structure for preventing a hand shake to a photographing unit will be described as an example as an optical element unit. Further, in the following description, three directions perpendicular to each other are set to be "X"-axis, "Y"-axis and "Z"-axis and a direction along an optical axis "L" (lens optical axis) is set to be the "Z"-axis. Therefore, in the following description, regarding swings of the respective directions, turning around the "X"-axis corresponds to a so-called pitching (vertical swing), turning around the "Y"-axis corresponds to a so-called yawing (lateral swing), and turning around the "Z"-axis corresponds to a so-called rolling. Further, "+X" is indicated on one side of the "X"-axis, "−X" is indicated on the other side, "+Y" is indicated on one side of the "Y"-axis, "−Y" is indicated on the other side, "+Z" is indicated on one side (opposite side to an object side) of the "Z"-axis, and "−Z" is indicated on the other side (object side).

First Embodiment

Entire Structure of Optical Unit for Photographing

Figure 1:
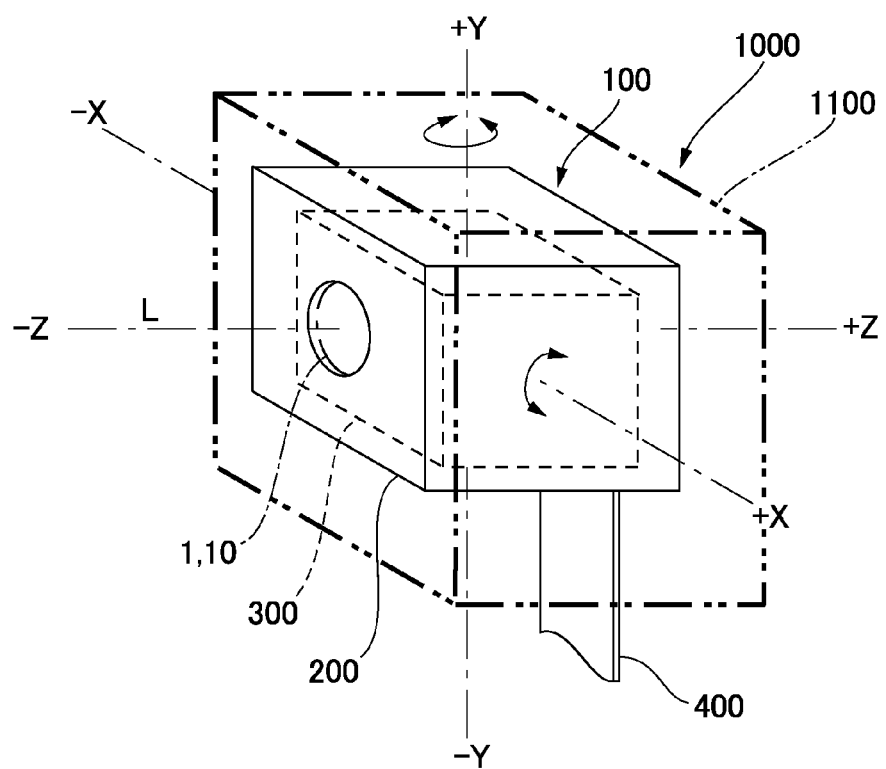

FIG. 1 is an explanatory view schematically showing a state in which an optical unit with a shake correcting function to which the present invention is applied is mounted on an optical device such as a cell phone or the like. An optical unit 100 (optical unit with a shake correcting function) shown in FIG. 1 is a thin camera used in an optical device 1000 such as a cell phone with a camera and is mounted in a supported state by a chassis 1110 of the optical device 1000 (device main body). In the optical unit 100, when a shake such as a hand shake is occurred in the optical device 1000 at the time of photographing, disturbance occurs in a photographed image.

Figure 3A:
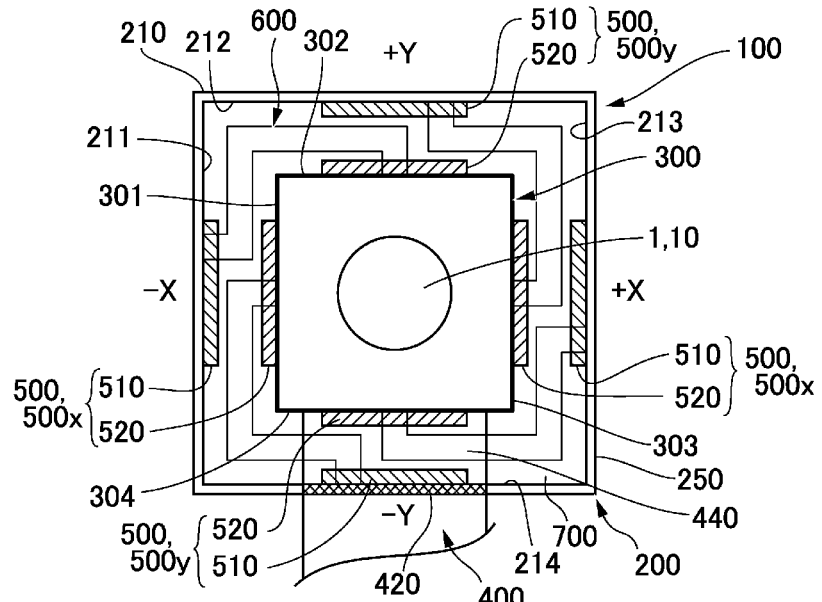
FIGS. 3(a), 3(b) and 3(c) are explanatory views schematically showing an internal structure of an optical unit with a shake correcting function to which the present invention is applied.
Figure 3B:
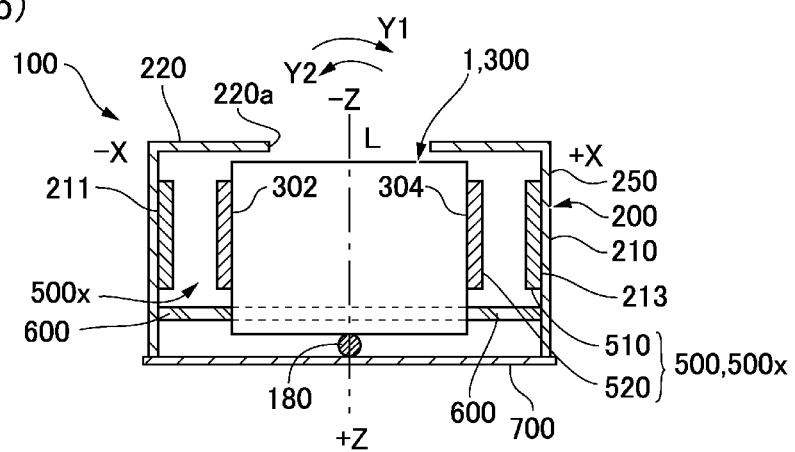
Figure 3C:
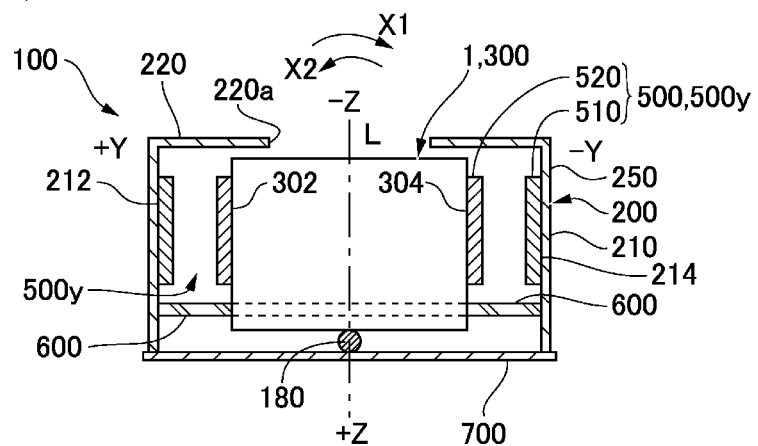

In order to prevent this problem, the optical unit 100 in this embodiment is, as described below with reference to FIGS. 3(a), 3(b) and 3(c), provided with a movable module drive mechanism (not shown in FIG. 1) which swingably supports a movable module 300 including a photographing unit 1 within a fixed body 200 and swings the movable module 300 on the basis of a detection result for a hand shake by a shake detection sensor such as a gyroscope (not shown) mounted on the optical unit 100 or a gyroscope (not shown) mounted on a main body side of the optical device 1000. A flexible circuit board 400 is extended from the optical unit 100 for supplying power to an imaging element mounted on the photographing unit 1 and the lens drive mechanism. The flexible circuit board 400 is electrically connected with a host control section or the like which is provided in the main body of the optical device 1000 through a connector 490.

The flexible circuit board 400 is also provided with a function for outputting a signal from an imaging element mounted on the photographing unit 1. Therefore, the number of wiring lines in the flexible circuit board 400 is large and thus the width of the flexible circuit board 400 is wide.

(Structure of Photographing Unit 1)

Figure 2:
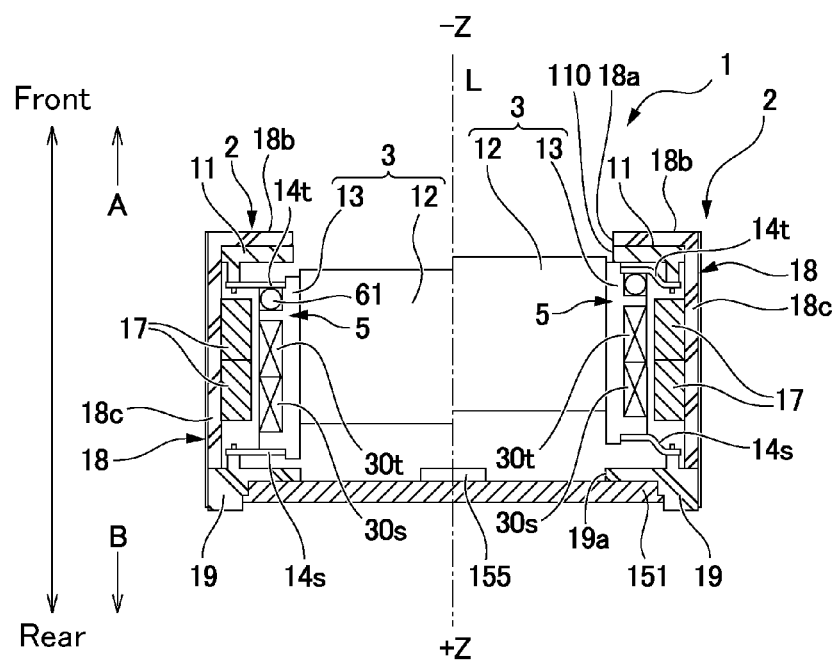
FIG. 2 is an explanatory view showing a photographing unit which is mounted on a movable module of an optical unit with a shake correcting function to which the present invention is applied.

FIG. 2 is an explanatory view showing a photographing unit 1 which is mounted on a movable module 300 of an optical unit 100 with a shake correcting function to which the present invention is applied. As shown in FIG. 2, the photographing unit 1 is, for example, an optical element unit which moves a plurality of lenses 10 as an optical element (see FIG. 1) in both directions, i.e., in an "A"-direction (front side) approaching an object to be photographed (object side) along a direction of the optical axis "L" and in a "B"-direction (rear side) approaching an opposite side (imaging element side/image side) to the object to be photographed. The photographing unit 1 is formed in a substantially rectangular prism shape. The photographing unit 1 generally includes a movable body 3 which holds optical elements such as a plurality of the lenses 10 and a fixed diaphragm on its inner side, a magnetic drive mechanism 5 for moving the movable body 3 along an optical axis "L" direction, and a support body 2 on which the magnetic drive mechanism 5, the movable body 3 and the like are mounted. The movable body 3 is provided with a lens holder 12 in a cylindrical tube shape which holds the lenses and the fixed diaphragm and a coil holder 13 which holds the lens holder 12 on its inner side. Lens drive coils 30s and 30t structuring the lens drive mechanism 5 are held on an outer peripheral side face of the coil holder 13.

The support body 2 is provided with an imaging element holder 19 in a rectangular plate shape which positions an imaging element 155 on an opposite side to an object side ("−Z" side), a box-shaped case 18 which is placed on the object side of the imaging element holder 19, and a spacer 11 in a rectangular plate shape which is disposed on an inner side of the case 18. Circular incident windows 110 and 18a for taking light from the object to be photographed to the lens are respectively formed at centers of the case 18 and the spacer 11. Further, a window 19a for guiding incident light to the imaging element 155 is formed at a center of the imaging element holder 19. In the photographing unit 1, the support body 2 is provided with a circuit board 151 on which the imaging element 155 is mounted and the circuit board 151 is fixed to an under face of the imaging element holder 19.

The case 18 is made of a ferromagnetic plate such as a steel plate and functions as a yoke. Therefore, the case 18 structures an interlinkage magnetic field generating body together with lens drive magnets 17 described below for generating an interlinkage magnetic field in the lens drive coils 30s and 30t. The interlinkage magnetic field generating body structures the lens drive mechanism 5 together with the lens drive coils 30s and 30t which are wound around an outer peripheral face of the coil holder 13.

The support body 2 and the movable body 3 are connected with each other through metal spring members 14s and 14t which are disposed at separated positions in the optical axis "L" direction. Basic structures of the spring members 14s and 14t are similar to each other and each of the spring members 14s and 14t is provided with an outer peripheral side connecting part which is held by the support body 2, a circular ring-shaped inner peripheral side connecting part which is held by the movable body 3, and arm-shaped plate spring parts which connects the outer peripheral side connecting part with the inner peripheral side connecting part. In the spring members 14s and 14t, the outer peripheral side connecting part of the spring member 14s on the imaging element 155 side is held by the imaging element holder 19 and its inner peripheral side connecting part is connected with an imaging element side end part of the coil holder 13 of the movable body 3. The outer peripheral side connecting part of the spring member 14t on the object side is held by the spacer 11 and its inner peripheral side connecting part is connected with an object side end part of the coil holder 13 of the movable body 3. In this manner, the movable body 3 is supported by the support body 2 through the spring members 14s and 14t so as to be movable in the direction of the optical axis "L". Each of the spring members 14s and 14t is made of nonmagnetic metal such as beryllium copper or nonmagnetic SUS steel material and is formed by performing press working or etching processing using photo lithography technique on a thin plate having a certain thickness. In the spring members 14s and 14t, the spring member 14s is divided into two spring pieces and respective coil ends of the lens drive coils 30s and 30t are connected with the respective spring pieces. Further, two spring pieces of the spring member 14s are formed with a terminal and thus the spring member 14s functions as a power supply member for the lens drive coils 30s and 30t.

A ring-shaped magnetic piece 61 is held at an object side end part of the coil holder 13 and the position of the magnetic piece 61 is held at a position on the object side with respect to the lens drive magnet 17. Therefore, the magnetic piece 61 applies an urging force in the direction of the optical axis "L" to the movable body 3 by an attraction force acted between the lens drive magnets 17 and the magnetic piece 61. Accordingly, at a non-energization time (home position), the lens holder 12 is set stationary on the imaging element 155 side by the attraction force between the lens drive magnets 17 and the magnetic piece 61. Further, the magnetic piece 61 acts as a yoke and thus a leakage flux from a magnetic path structured between the lens drive magnets 17 and the lens drive coils 30s and 30t can be reduced. The magnetic piece 61 may be formed in a bar shaped magnetic body or a spherical shaped magnetic body. In a case that the magnetic piece 61 is formed in a ring shape, when the lens holder 12 is to be moved in the optical axis "L" direction, an attraction force is isotropically acted between the lens drive magnets 17 and the magnetic piece 61. In addition, at the time of energization to the lens drive coils 30s and 30t, the magnetic piece 61 is moved in a direction separating from the lens drive magnets 17 and thus an unnecessary force pressing the lens holder 12 to the imaging element 155 side may not act. Therefore, the lens holder 12 can be moved in the optical axis "L" direction with a small electric power.

In the photographing unit 1 in this embodiment, the lens 10 (see FIG. 1) is formed in a circular shape when viewed in the direction of the optical axis "L" but the case 18 used as the support body 2 is formed in a rectangular box-like shape. Therefore, the case 18 is provided with a rectangular tube-shaped body part 18c and an upper plate part 18b formed with the incident window 18a is provided on an upper face side of the rectangular tube-shaped body part 18c. The lens drive magnets 17 are fixed to side face parts corresponding to the sides of a quadrangle of the rectangular tube-shaped body part 18c and the lens drive magnets 17 are respectively comprised of a rectangular flat plate-shaped permanent magnet. Each of four lens drive magnets 17 is divided into two pieces in the direction of the optical axis "L" and is magnetized so that a magnetic pole of its inner face and a magnetic pole of its outer face are different from each other.

In this embodiment, when the coil holder 13 is viewed in the direction of the optical axis "L", its inner peripheral shape is circular but an outer peripheral side face which determines an outer peripheral shape of the coil holder 13 is quadrangular and the lens drive coils 30s and 30t are wound around the coil holder 13. Each of the four lens drive magnets 17 is divided into two pieces in the optical axis "L" direction and is magnetized so that the magnetic pole of its inner face and the magnetic pole of its outer face are different from each other and thus winding directions of the two lens drive coils 30s and 30t are opposite to each other. The movable body 3 which is structured as described above is disposed on an inner side of the case 18. As a result, the lens drive coils 30s and 30t face the lens drive magnets 17 which are fixed to the inner face of the rectangular tube-shaped body part 18c of the case 18.

In the photographing unit 1 structured as described above, the movable body 3 is normally located on the imaging element side (one side in the "Z"-axis direction) and, in this state, when an electric current is supplied to the lens drive coils 30s and 30t in a predetermined direction, an electro-magnetic force directing the object side (the other side in the "Z"-axis direction) is applied to the respective lens drive coils 30s and 30t. Therefore, the movable body 3 to which the lens drive coils 30s and 30t are fixed begins to move to the object side (front side). In this case, an elastic force restricting movement of the movable body 3 is generated between the spring member 14t and the front end of the movable body 3 and between the spring member 14s and the rear end of the movable body 3. Accordingly, when the electro-magnetic force for moving the movable body 3 to the front side and the elastic force for restricting the movement of the movable body 3 are balanced with each other, the movable body 3 is stopped. In this case, when an amount of an electric current supplied to the lens drive coils 30s and 30t is adjusted depending on the elastic force acting on the movable body 3 by the spring members 14s and 14t, the movable body 3 can be stopped at a desired position.

(Structure of Optical Unit 100)

FIGS. 3(a), 3(b) and 3(c) are explanatory views schematically showing an internal structure of an optical unit with a shake correcting function to which the present invention is applied. FIG. 3(a) is an explanatory plan view showing a structure of the optical unit, FIG. 3(b) is a cross-sectional view showing the optical unit whose center portion is cut along an "XZ" plane, and FIG. 3(c) is a cross-sectional view showing the optical unit whose center portion is cut along a "YZ" plane. In FIG. 3(a), the movable module 300 is indicated by a thick solid line, the permanent magnet is indicated by slanted lines upward to the right, and the drive coil is indicated by slanted lines downward to the right. Further, in FIGS. 3(b) and 3(c), the flexible circuit board 400 is not shown.

In FIGS. 3(a), 3(b) and 3(c), the optical unit 100 includes a fixed body 200, a movable module 300 provided with the photographing unit 1, a spring member 600 through which the movable module 300 is supported by the fixed body 200 so as to be capable of displacing, and a movable module drive mechanism 500 which generates a magnetic drive force for relatively displacing the movable module 300 with respect to the fixed body 200 between the movable module 300 and the fixed body 200. An outer peripheral portion of the movable module 300 is structured of the case 18 used in the support body 2 of the photographing unit 1, or a shielding case which accommodates the photographing unit 1, and the like.

In this embodiment, the fixed body 200 is provided with an upper cover 250 and a lower cover 700 and the upper cover 250 is provided with a rectangular tube-shaped body part 210 which surrounds the movable module 300 and an end plate part 220 which closes an opening part on the object side of the rectangular tube-shaped body part 210. The end plate part 220 is formed with a window 220a through which light from an object to be photographed is incident. In the upper cover 250, an end part on the opposite side ("+Z" side) to the object side (side to which the optical axis is extended) of the rectangular tube-shaped body part 210 is formed to be opened. Further, the rectangular tube-shaped body part 210 is formed with a hole and a cut-out part for extending the flexible circuit board 400 to an outer side. The flexible circuit board 400 and the fixed body 200 are fixed to each other with an adhesive or the like in the vicinity of the hole and the cut-out part.

On one side "+Z" (opposite side to the object side) of the "Z"-axis with respect to the movable module 300, a swing support point 180 for swinging the movable module 300 is provided between the movable module 300 and the lower cover 700 of the fixed body 200. In FIGS. 3(b) and 3(c), the swing support point 180 is schematically shown as a ball. However, the swing support point 180 is, for example, structured as a pivot bearing which is provided with a hemispheric protruding part which is protruded from the movable module 300 and a receiving part which receives the hemispheric protruding part by the lower cover 700. Further, the swing support point 180 may be structured as a pivot bearing which is provided with a hemispheric protruding part which is protruded from the lower cover 700 and a receiving part which receives the hemispheric protruding part by the movable module 300. In each of the cases, the movable module 300 is urged toward the lower cover 700 by the spring member 600 through the swing support point 180 and is capable of being swung with the support point 180 as a swing center.

(Detail Structure of Spring Member 600)

Figure 4:
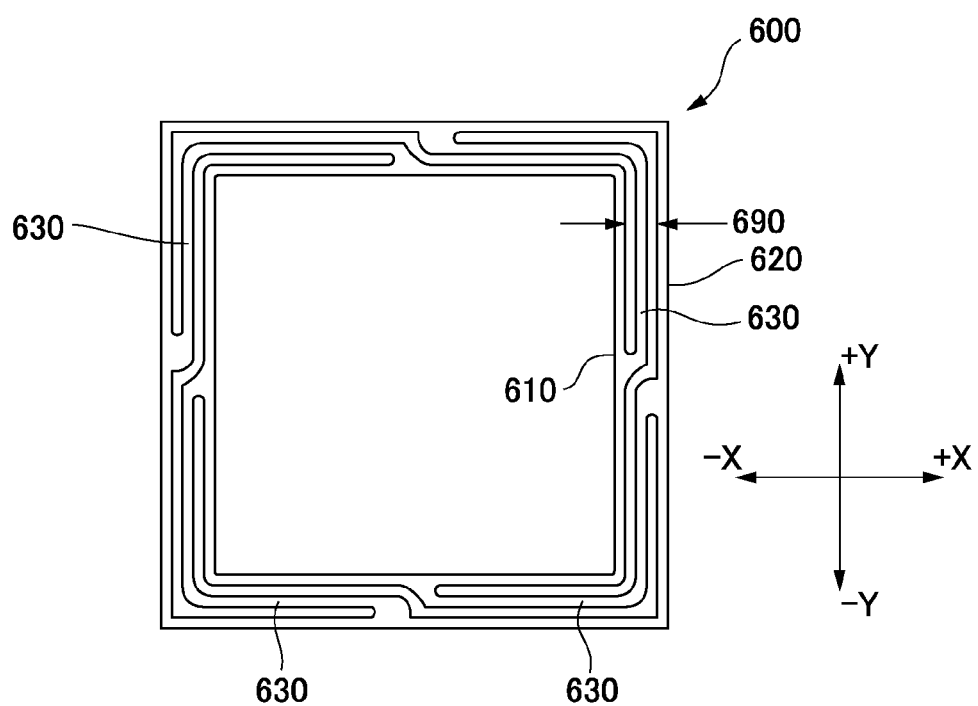
FIG. 4 is a plan view showing a spring member which is used in an optical unit with a shake correcting function to which the present invention is applied.

FIG. 4 is a plan view showing a spring member 600 which is used in the optical unit 100 with a shake correcting function to which the present invention is applied. As shown in FIGS. 3(a), 3(b) and 3(c) and FIG. 4, the spring member 600 is a plate-shaped spring member which is provided with a movable side connecting part 610 connected with the movable module 300, a fixed side connecting part 620 connected with the fixed body 200, and a plurality of arm parts 630 which are extended between the movable side connecting part 610 and the fixed side connecting part 620. Both ends of the arm part 630 are respectively connected with the movable side connecting part 610 and the fixed side connecting part 620. In this embodiment, the movable side connecting part 610 of the spring member 600 is connected on a rear end side of the movable module 300. The spring member 600 is made of nonmagnetic metal such as beryllium copper or nonmagnetic SUS steel material and is formed by performing press working or etching processing using a photo lithography technique on a thin plate having a certain thickness.

(Detail Structure of Movable Module Drive Mechanism 500)

In FIGS. 3(a), 3(b) and 3(c), the movable module drive mechanism 500 is provided with drive coils 510 and permanent magnets 520 for generating magnetic fields interlinking with the drive coils 510 as described below. The permanent magnet 520 is fixed to four side faces 301, 302, 303 and 304 of the movable module 300 and the drive coil 510 is fixed to inner faces 211, 212, 213 and 214 of the rectangular tube-shaped body part 210 of the upper cover 250. The permanent magnet 520 is magnetized so that a pole on its outer face side is different from a pole on its inner face side. Further, the drive coil 510 is an air-core coil which is wound around in a quadrangular frame shape and upper and lower side portions of the drive coil 510 are utilized as an effective side.

In the permanent magnets 520 and the drive coils 510, the permanent magnets 520 and the drive coils 510 disposed at two positions so as to interpose the movable module 300 on both sides in the "X"-axis direction structure an "X"-side movable module drive mechanism 500x and, as shown by the arrows "Y1" and "Y2" in FIG. 3(b), the "X"-side movable module drive mechanism 500x swings the movable module 300 around the "Y"-axis with the swing support point 180 as a swing center. Further, the permanent magnets 520 and the drive coils 510 disposed at two positions so as to interpose the movable module 300 on both sides in the "Y"-axis direction structure a "Y"-side movable module drive mechanism 500y and, as shown by the arrows "X1" and "X2" in FIG. 3(c), the "Y"-side movable module drive mechanism 500x swings the movable module 300 around the "X"-axis with the swing support point 180 as a swing center.

(Operation of Shake Correction)

In the optical unit 100 in this embodiment, when the optical device 1000 shown in FIG. 1 is swung, the swing is detected by a gyroscope and the host control section controls the movable module drive mechanism 500 based on the detection of the gyroscope. In other words, a driving current for cancelling the swing detected by the gyroscope is supplied to the drive coils 510 through the flexible circuit board 400 or a flexible circuit board (not shown) which is separately structured from the flexible circuit board 400. As a result, the "X"-side movable module drive mechanism 500x swings the movable module 300 around the "Y"-axis with the swing support point 180 as a swing center. Further, the "Y"-side movable module drive mechanism 500y swings the movable module 300 around the "X"-axis with the swing support point 180 as a swing center. Further, when the swing of the movable module 300 around the "X"-axis and the swing around the "Y"-axis are combined with each other, the movable module 300 can be displaced over the entire "X-Y" plane. Therefore, all swings occurred in the optical unit 100 can be corrected surely.

(Structure of Flexible Circuit Board 400)

Figure 5A:
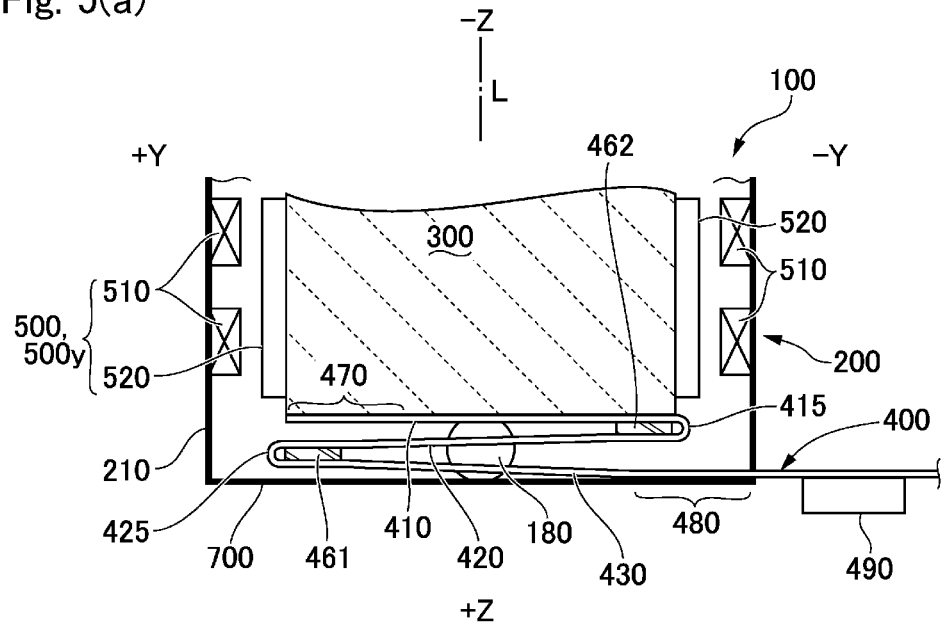
FIGS. 5(a), 5(b) and 5(c) are explanatory views showing a state in which a flexible circuit board is mounted in an optical unit with a shake correcting function in accordance with a first embodiment of the present invention.
Figure 5B:
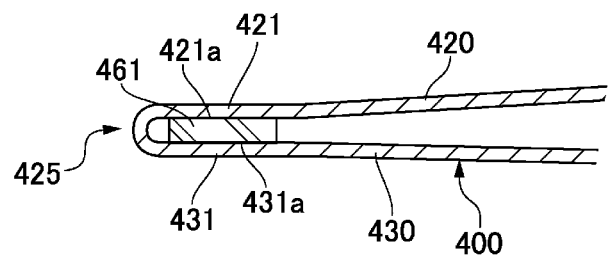
Figure 5C:
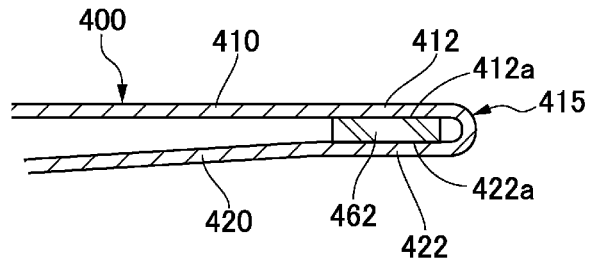
Figure 6A:
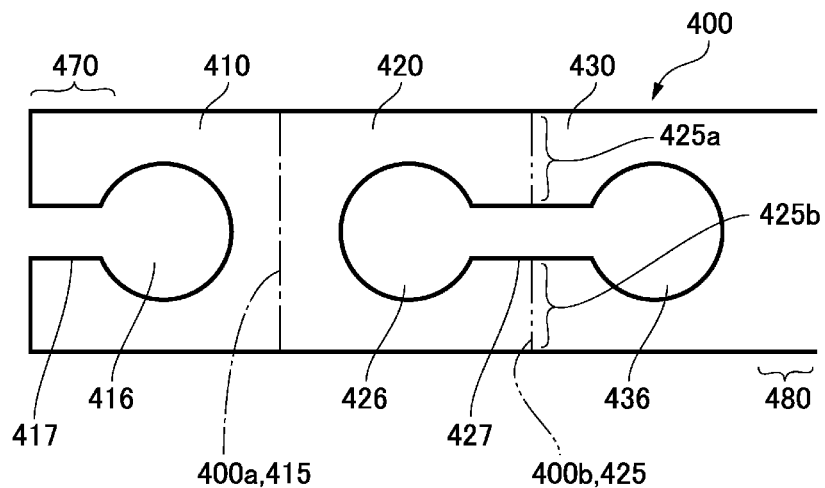
FIGS. 6(a) and 6(b) are explanatory views showing the flexible circuit board which is used in the optical unit with a shake correcting function in accordance with the first embodiment of the present invention.
Figure 6B:
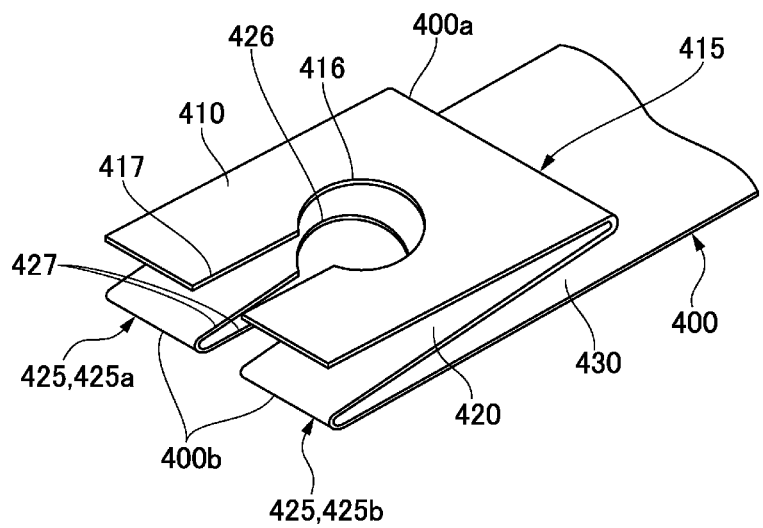

FIGS. 5(a), 5(b) and 5(c) are explanatory views showing a state in which the flexible circuit board 400 is mounted in the optical unit 100 with a shake correcting function in accordance with a first embodiment of the present invention. FIG. 5(a) is a cross-sectional view showing the optical unit 100, FIG. 5(b) is a cross-sectional view showing a folded-back portion of the flexible circuit board 400, and FIG. 5(c) is a cross-sectional view showing another folded-back portion of the flexible circuit board 400. FIGS. 6(a) and 6(b) are explanatory views showing the flexible circuit board 400 which is used in the optical unit 100 with a shake correcting function in accordance with the first embodiment of the present invention. FIG. 6(a) is a plan view showing a state in which the flexible circuit board 400 is developed, and FIG. 6(b) is a perspective view showing a state in which the flexible circuit board 400 is bent. In FIG. 6(a), a ridge-folding part of the flexible circuit board 400 is indicated by an alternate long and short dash line and a valley-folding part is indicated by a two-dot chain line.

As shown in FIG. 5(a) and FIGS. 6(a) and 6(b), in the optical unit 100 in this embodiment, the flexible circuit board 400 is provided at a position on one side in the optical axis direction (one side "+Z" in the "Z" direction) with respect to the movable module 300 so as to superpose on the movable module 300. The flexible circuit board 400 is bent at 180 degrees at two positions of a midway portion in an extended direction and is formed in a "Z"-character shape which is provided with two folded-back portions 415 and 425 whose extended direction is reversed. Specifically, in the flexible circuit board 400, the folded-back portion 415 is formed by bending a midway portion in the extended direction to be a ridge-folding part 400a and the folded-back portion 425 is formed by bending a portion separated from the ridge-folding part 400a in the extended direction to be a valley-folding part 400b. As a result, the flexible circuit board 400 is formed from the movable module 300 side toward an outer side of the optical unit 100 with a first extended part 410, a second extended part 420 which is continuously connected with the first extended part 410 through the folded-back portion 415, and a third extended part 430 which is continuously connected with the second extended part 420 through the folded-back portion 425. In this embodiment, the second extended part 420 is superposed on the first extended part 410 on one side "+Z" in the "Z" direction and the third extended part 430 is superposed on the second extended part 420 on the one side "+Z" in the "Z" direction. Further, a tip end side of the first extended part 410 is utilized as a connected portion 470 to a bottom part of the movable module 300 and a midway portion of the third extended part 430 is utilized as a connected portion 480 to the lower cover 700 of the fixed body 200. Therefore, the flexible circuit board 400 is structured to be provided with two folded-back portions 425 and 415 whose extended direction is reversed at a midway portion from the connected portion 480 with the fixed body 200 to the connected portion 470 with the movable module 300. Spaces of about 1.0 mm are secured in the optical axis direction between the folded-back portion 425 and the movable module 300 and between the folded-back portion 425 and the lower cover 700 of the fixed body 200.

In this embodiment, the first extended part 410, the second extended part 420 and the third extended part 430 of the flexible circuit board 400 are located between the movable module 300 and the lower cover 700 of the fixed body 200 and the swing support point 180 for swinging the movable module 300 is provided between the movable module 300 and the lower cover 700 of the fixed body 200. Therefore, in this embodiment, as shown in FIGS. 6(a) and 6(b), holes 416, 426 and 436 are formed in the first extended part 410, the second extended part 420 and the third extended part 430 of the flexible circuit board 400 at positions superposed on the swing support point 180. Accordingly, the swing support point 180 is provided between the movable module 300 and the lower cover 700 of the fixed body 200 without contacting with the flexible circuit board 400.

Further, a groove 417 is formed in the first extended part 410 of the flexible circuit board 400 from the hole 416 toward an end part of a tip end side (opposite side to a side where the folded-back portion 415 is located). Further, a groove 427 connecting the holes 426 and 436 with each other is formed in the second extended part 420 and the third extended part 430 of the flexible circuit board 400. Therefore, the folded-back portion 425 of the flexible circuit board 400 is divided into the first folded-back portion 425*a* and the second folded-back portion 425*b* in a direction intersecting an extended direction of the flexible circuit board 400 so as to be extended on both sides of the swing support point 180.

(Detailed Structure of Folded-Back Portions 415 and 425)

As shown in FIG. 5(*a*), portions of the folded-back portions 415 and 425 where the flexible circuit board 400 is superposed on each other are fixed to each other. Specifically, as shown in FIG. 5(*b*), in portions 421 and 431 of the folded-back portion 425 where the flexible circuit board 400 is superposed on each other, faces 421*a* and 431*a* facing each other are fixed to each other by a joining member comprised of a thermosetting adhesive sheet 461. The thermosetting adhesive sheet 461 is a sheet-shaped product which is formed of a thermosetting adhesive such as epoxy resin. After the thermosetting adhesive sheet 461 is interposed between the portions 421 and 431 of the folded-back portion 425 where the flexible circuit board 400 is superposed on each other, for example, the folded-back portion 425 is heat-pressed under a condition that the temperature is 160° C., the pressure is 1 MPa, and the time period is 1 minute and, as a result, the portions 421 and 431 superposed on each other are adhesively fixed to each other. Further, as shown in FIG. 5(*c*), similarly to the folded-back portion 425, in portions 412 and 422 of the folded-back portion 415 where the flexible circuit board 400 is superposed on each other, faces 412*a* and 422*a* facing each other are fixed to each other by a joining member comprised of a thermosetting adhesive sheet 462. The thermosetting adhesive sheet 462 is, similarly to the thermosetting adhesive sheet 461, a sheet-shaped product which is formed of a thermosetting adhesive such as epoxy resin. After the thermosetting adhesive sheet 462 is interposed between the portions 412 and 422 of the folded-back portion 415 where the flexible circuit board 400 is superposed on each other, the folded-back portion 415 is heat-pressed so that the portions 412 and 422 superposed on each other are adhesively fixed to each other.

As shown in FIGS. 5(*b*) and 5(*c*), the thermosetting adhesive sheets 461 and 462 are provided at positions slightly separated from inner corner portions of the folded-back portions 415 and 425 with a predetermined width dimension and thus the portions 421 and 431 superposed on each other and the portions 412 and 422 superposed on each other are fixed to each other over a predetermined width dimension. As a result, the thermosetting adhesive sheets 461 and 462 fix the superposed portions 421 and 431 and the superposed portions 412 and 422 over a range of 0.5 mm-2.0 mm in a width dimension from their ends. When the superposed portions 421 and 431 and the superposed portions 412 and 422 are fixed to each other in the narrow range, the superposed portions 421 and 431 and the superposed portions 412 and 422 are fixed to each other while maintaining the flexibility of the flexible circuit board 400.

In accordance with an embodiment of the present invention, liquid type adhesive layer may be used as the joining member instead of using the thermosetting adhesive sheets 461 and 462. The portions 412 and 422 superposed on each other in the folded-back portion 415 and the portions 421 and 431 superposed on each other in the folded-back portion 425 may be fixed by the adhesive layer.

Principal Effects in this Embodiment

As described above, in the flexible circuit board 400 which is connected with the fixed body 200 and the movable module 300 in the optical unit 100 in this embodiment, the folded-back portions 415 and 425 whose extended direction is reversed are provided at midway portions from the connected portion 480 with the fixed body 200 to the connected portion 470 with the movable module 300, and the portions 412 and 422 superposed on each other in the folded-back portion 415 and the portions 421 and 431 superposed on each other in the folded-back portion 425 are fixed to each other by the joining member comprised of the thermosetting adhesive sheets 461 and 462. Therefore, even when a structure is adopted in which the flexible circuit board 400 is provided with the folded-back portions 415 and 425 and is extended so as to make a length dimension of the flexible circuit board 400 longer for weakening the rigidity and the shape restoring force of the flexible circuit board 400, the degree of bending of the folded-back portions 415 and 425 is not varied in an initial state or with a lapse of time. Accordingly, when the movable module 300 is swung for preventing a shake, an effect applied to the movable module 300 by the flexible circuit board 400 is prevented from being varied, the movable module 300 is swung with a high degree of accuracy.

Further, in this embodiment, in the folded-back portions 415 and 425, the faces 412*a* and 422*a* facing each other and the faces 421*a* and 431*a* facing each other are fixed to each other by the joining member comprised of the thermosetting adhesive sheets 461 and 462. Therefore, in the folded-back portions 415 and 425, the portions 412 and 422 superposed on each other and the portions 421 and 431 superposed on each other are fixed to each other on the inner sides of the folded-back portions 415 and 425 and thus space saving is attained. In addition, in this embodiment, the thermosetting adhesive sheets 461 and 462 are used as a joining member. Therefore, after the thermosetting adhesive sheets 461 and 462 are interposed on the inner sides of the folded-back portions 415 and 425, when the thermosetting adhesive sheets 461 and 462 are cured, the faces 412*a* and 422*a* facing each other and the faces 421*a* and 431*a* facing each other are fixed to each other in the folded-back portions 415 and 425.

Further, the swing support point 180 for swinging the movable module 300 is provided between the fixed body 200 and the movable module 300 on a side where the folded-back portions 415 and 425 are located. Therefore, a deformed quantity of the flexible circuit board 400 when the movable module 300 is swung is restrained small. Accordingly, an effect applied to the movable module 300 by the flexible circuit board 400 is reduced and thus the movable module 300 can be swung with a high degree of accuracy.

Further, the folded-back portion 425 is divided into the first folded-back portion 425*a* and the second folded-back portion 425*b* in a direction intersecting the extended direction of the flexible circuit board 400 so as to extend on both sides of the swing support point 180. Therefore, a width dimension of the flexible circuit board 400 is narrow and thus the rigidity and the shape restoring force of the flexible circuit board 400 can be weakened. Further, in this embodiment, in order to divide the folded-back portion 425 into the first folded-back portion 425*a* and the second folded-back portion 425*b*, the holes 426 and 436 connected with the groove 427 are formed at the positions superposed on the swing support point 180. Therefore, even when the flexible circuit board 400 is provided on the side where the swing support point 180 is located in the optical axis direction, the flexible circuit board 400 does not contact with the swing support point 180. Accordingly, when the movable module 300 is swung, an unnecessary force is prevented from being applied from the flexible circuit board 400 to the movable module 300.

Second Embodiment

Figure 7A:
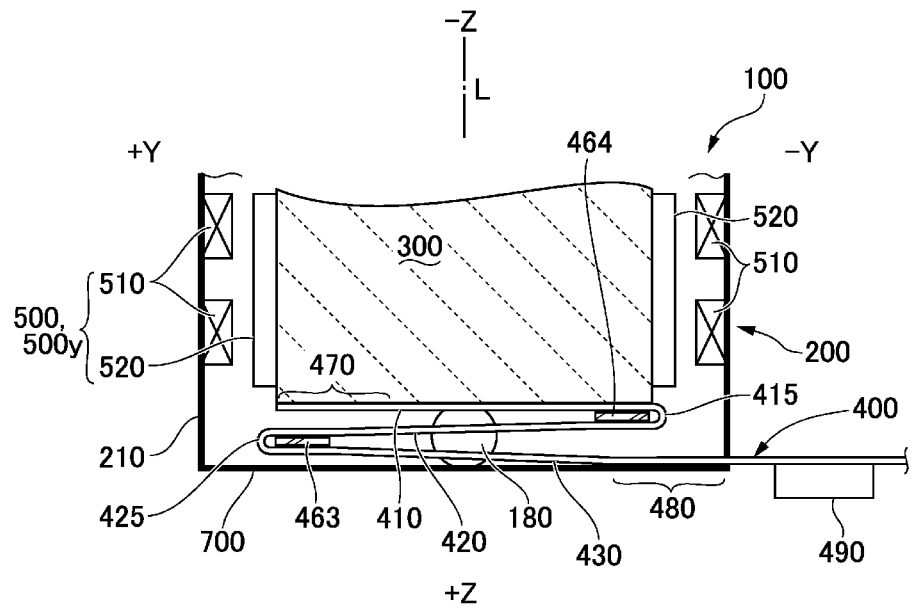
FIGS. 7(a), 7(b) and 7(c) are explanatory views showing a state in which a flexible circuit board is mounted in an optical unit with a shake correcting function in accordance with a second embodiment of the present invention.
Figure 7B:
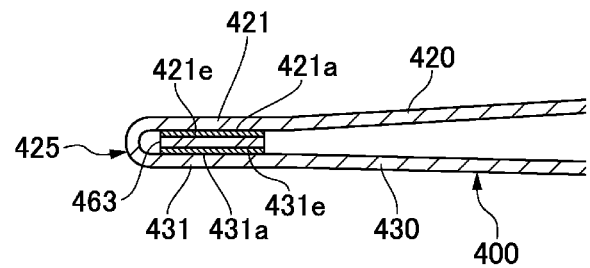
Figure 7C:
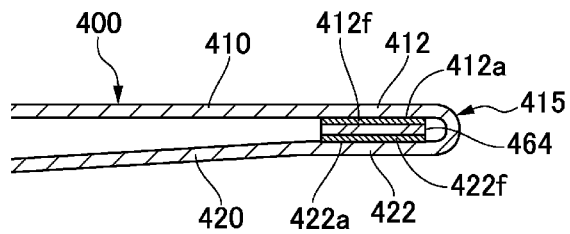

FIGS. 7(a), 7(b) and 7(c) are explanatory views showing a state in which a flexible circuit board 400 is mounted in an optical unit 100 with a shake correcting function in accordance with a second embodiment of the present invention. FIG. 7(a) is a cross-sectional view showing the optical unit 100, FIG. 7(b) is a cross-sectional view showing a folded-back portion 425 of the flexible circuit board 400, and FIG. 5(c) is a cross-sectional view showing another folded-back portion 415 of the flexible circuit board 400. Basic structure in this embodiment is similar to the first embodiment and thus the same reference signs are used in common portions and their descriptions are omitted.

Also in this embodiment, similarly to the first embodiment, as shown in FIG. 7(a), in the folded-back portions 415 and 425 of the flexible circuit board 400, the portions where the flexible circuit board 400 is superposed on each other are fixed to each other. Specifically, as shown in FIG. 7(b), in the folded-back portion 425, faces 421a and 431a on inner sides of portions 421 and 431 of the flexible circuit board 400 which are superposed on each other are formed with metal patterns 421e and 431e comprised of copper foil which structures a wiring pattern in the flexible circuit board 400. The metal patterns 421e and 431e are fixed to each other by solder 463 as a joining member. Further, as shown in FIG. 7(c), also in the folded-back portion 415, similarly to the folded-back portion 425, faces 412a and 422a on inner sides of portions 412 and 422 of the flexible circuit board 400 which are superposed on each other are formed with metal patterns 412f and 422f comprised of copper foil which structures a wiring pattern in the flexible circuit board 400. The metal patterns 412f and 422f are fixed to each other by solder 464 as a joining member. Joining of the solders 463 and 464 is, for example, performed by applying a hot-press under a condition that the temperature is 250° C., the pressure is 1 MPa, and the time period is 3 seconds after solder paste is applied. Also in this embodiment, the solders 463 and 464 are provided at positions slightly separated from inner corner portions of the folded-back portions 415 and 425 with a predetermined width dimension and thus the portions 421 and 431 superposed on each other and the portions 412 and 422 superposed on each other are fixed to each other over a predetermined width dimension. For example, the solders 463 and 464 fix the superposed portions 421 and 431 and the superposed portions 412 and 422 over a range of 0.5 mm-2.0 mm in a width dimension from their ends. When the superposed portions 421 and 431 and the superposed portions 412 and 422 are fixed to each other in the narrow range, the superposed portions 421 and 431 and the superposed portions 412 and 422 are fixed to each other while maintaining the flexibility of the flexible circuit board 400.

As described above, also in the optical unit 100 in this embodiment, substantially similarly to the first embodiment, in the flexible circuit board 400 which is connected with the fixed body 200 and the movable module 300, the folded-back portions 415 and 425 whose extended direction is reversed are provided at midway portions from the connected portion 480 with the fixed body 200 to the connected portion 470 with the movable module 300, and the portions 412 and 422 superposed on each other in the folded-back portion 415 and the portions 421 and 431 superposed on each other in the folded-back portion 425 are fixed to each other by the joining member comprised of the solders 463 and 464. Therefore, even when a structure is adopted in which the flexible circuit board 400 is provided with the folded-back portions 415 and 425 and is extended so as to make a length dimension of the flexible circuit board 400 longer for weakening the rigidity and the shape restoring force of the flexible circuit board 400, the degree of bending of the folded-back portions 415 and 425 is not varied in an initial state or with a lapse of time. Accordingly, when the movable module 300 is swung for preventing a shake, an effect applied to the movable module 300 by the flexible circuit board 400 is prevented from being varied, the movable module 300 is swung with a high degree of accuracy.

Further, also in this embodiment, substantially similarly to the first embodiment, in the folded-back portions 415 and 425, the faces 412a and 422a facing each other and the faces 421a and 431a facing each other are fixed to each other by the joining member comprised of the solders 463 and 464. Therefore, in the folded-back portions 415 and 425, the portions 412 and 422 superposed on each other and the portions 421 and 431 superposed on each other are fixed to each other on the inner sides of the folded-back portions 415 and 425 and thus space saving is attained.

In addition, in this embodiment, the solders 463 and 464 are used as a joining member and thus, when soldering work performed on the flexible circuit board 400 is additionally applied to the folded-back portions 415 and 425, the portions 412 and 422 superposed on each other and the portions 421 and 431 superposed on each other are fixed to each other in the folded-back portions 415 and 425. Therefore, a separate member and a separate equipment are not required.

Third Embodiment

Figure 8A:
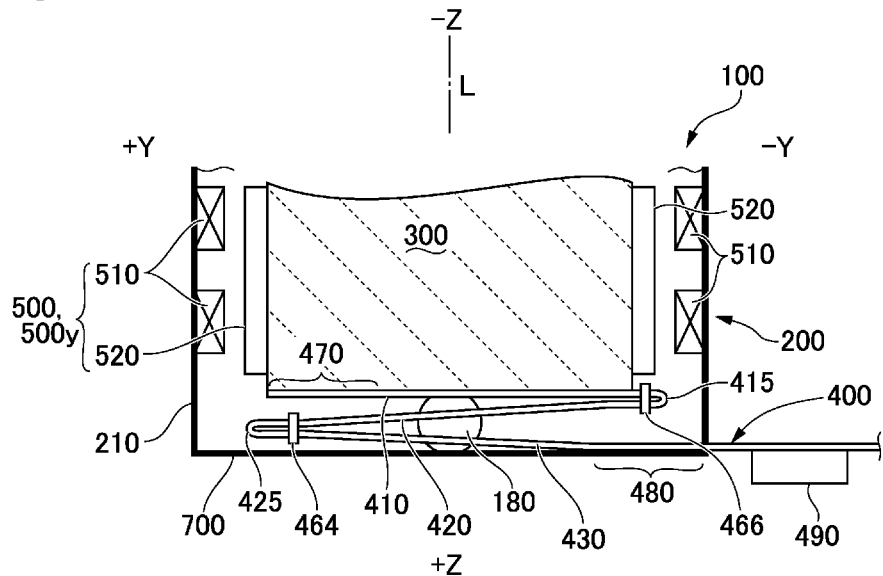
FIGS. 8(a), 8(b), 8(c) and 8(d) are explanatory views showing a state in which a flexible circuit board is mounted in an optical unit with a shake correcting function in accordance with a third embodiment of the present invention.
Figure 8B:
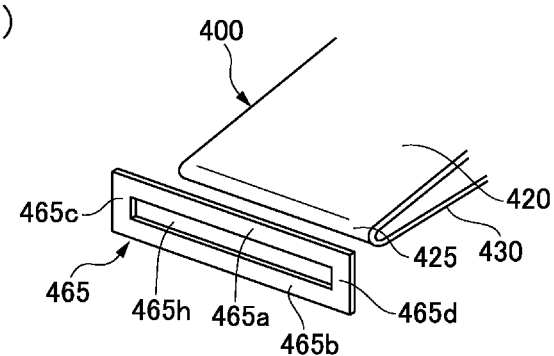
Figure 8C:
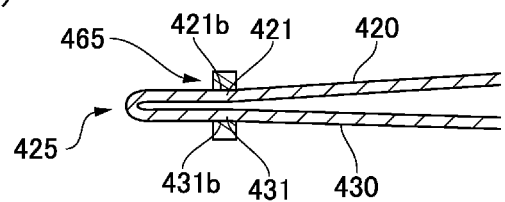
Figure 8D:
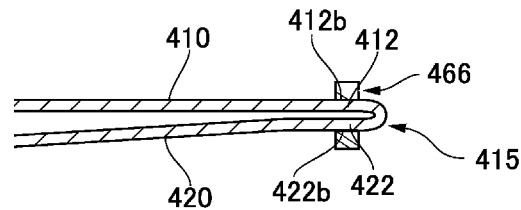

FIGS. 8(a), 8(b), 8(c) and 8(d) are explanatory views showing a state in which a flexible circuit board 400 is mounted in the optical unit 100 with a shake correcting function in accordance with a third embodiment of the present invention. FIG. 8(a) is a cross-sectional view showing the optical unit 100, FIG. 8(b) is a perspective view showing a clip (restricting member) which is used for fixing the folded-back portions 415 and 425 of the flexible circuit board 400, FIG. 8(c) is a cross-sectional view showing the folded-back portion 425 of the flexible circuit board 400, and FIG. 8(d) is a cross-sectional view showing another folded-back portion 415 of the flexible circuit board 400. Basic structure in this embodiment is similar to the first embodiment and thus the same reference signs are used in common portions and their descriptions are omitted.

Also in this embodiment, similarly to the first embodiment, as shown in FIG. 8(a), in the folded-back portions 415 and 425 of the flexible circuit board 400, the portions where the flexible circuit board 400 is superposed on each other are fixed to each other. Specifically, as shown in FIGS. 8(b) and 8(c), in the folded-back portion 425, the portions 421 and 431 of the flexible circuit board 400 which are superposed on each other are fixed by a clip 465 (restricting member) which sandwiches and restricts the folded-back portion 425 from the outer side faces 421b and 431b.

In this embodiment, the clip 465 is, as shown in FIG. 8(b), formed in a shape in which a sheet-shaped member whose thickness is about 0.1 mm is cut out in a rectangular frame shape having long side portions 465a and 465b and short side portions 465c and 465d. The folded-back portion 425 is inserted into an opening part 465h having a slit shape.

Further, as shown in FIG. 8(d), also in the folded-back portion 415, similarly to the folded-back portion 425, the portions 412 and 422 of the flexible circuit board 400 which are superposed on each other are fixed by a clip 466 (restricting member) which sandwiches and restricts the folded-back portion 415 from the outer side faces 412b and 422b.

As shown in FIGS. 8(c) and 8(d), the clips 465 and 466 are attached at separated positions from end parts of the folded-back portions 415 and 425. In this embodiment, a dimension from the end part of the folded-back portion 425 to the clip 465 is set to be larger than a dimension from the end part of the folded-back portion 415 to the clip 466. In this case, the clips 465 and 466 fix the superposed portions 421 and 431 and the superposed portions 412 and 422 over a range of 0.5 mm-2.0 mm in a width dimension from their ends. When the superposed portions 421 and 431 and the superposed portions 412 and 422 are fixed to each other in the narrow range, the superposed portions 421 and 431 and the superposed portions 412 and 422 are fixed to each other while maintaining the flexibility of the flexible circuit board 400.

As described above, also in the optical unit 100 in this embodiment, substantially similarly to the first embodiment, in the flexible circuit board 400 which is connected with the fixed body 200 and the movable module 300, the folded-back portions 415 and 425 whose extended direction is reversed are provided at midway portions from the connected portion 480 with the fixed body 200 to the connected portion 470 with the movable module 300, and the portions 412 and 422 superposed on each other in the folded-back portion 415 and the portions 421 and 431 superposed on each other in the folded-back portion 425 are fixed to each other by the joining member comprised of the clips 465 and 466. Therefore, even when a structure is adopted in which the flexible circuit board 400 is provided with the folded-back portions 415 and 425 and is extended so as to make a length dimension of the flexible circuit board 400 longer for weakening the rigidity and the shape restoring force of the flexible circuit board 400, the degree of bending of the folded-back portions 415 and 425 is not varied in an initial state or with a lapse of time. Accordingly, when the movable module 300 is swung for preventing a shake, an effect applied to the movable module 300 by the flexible circuit board 400 is prevented from being varied, the movable module 300 is swung with a high degree of accuracy.

Further, in this embodiment, different from the first and the second embodiments, the clips 466 and 465 (restricting member) are used which sandwich and restrict the folded-back portions 415 and 425 from the outer side faces 412b, 422b, 421b and 431b. Therefore, the clips 466 and 465 are comparatively easily detached through a work by which the clips 466 and 465 are cut off or pulled off and thus repair and disassembling are easily performed.

In accordance with an embodiment of the present invention, instead of using the clips 465 and 466, a heat-shrinkable member (heat-shrinkable tube) formed in a ring shape may be used as the restricting member for sandwiching and restricting the folded-back portions 415 and 425 from the outer side faces 412b, 422b, 421b and 431b. In a case that the heat-shrinkable member is used, after the folded-back portions 415 and 425 are inserted into the inner sides of heat-shrinkable members, the heat-shrinkable members are heated to be shrunken, the portions 412 and 422 superposed on each other and the portions 421 and 431 superposed on each other in the folded-back portions 415 and 425 are fixed to each other.

Fourth Embodiment

Figure 9:
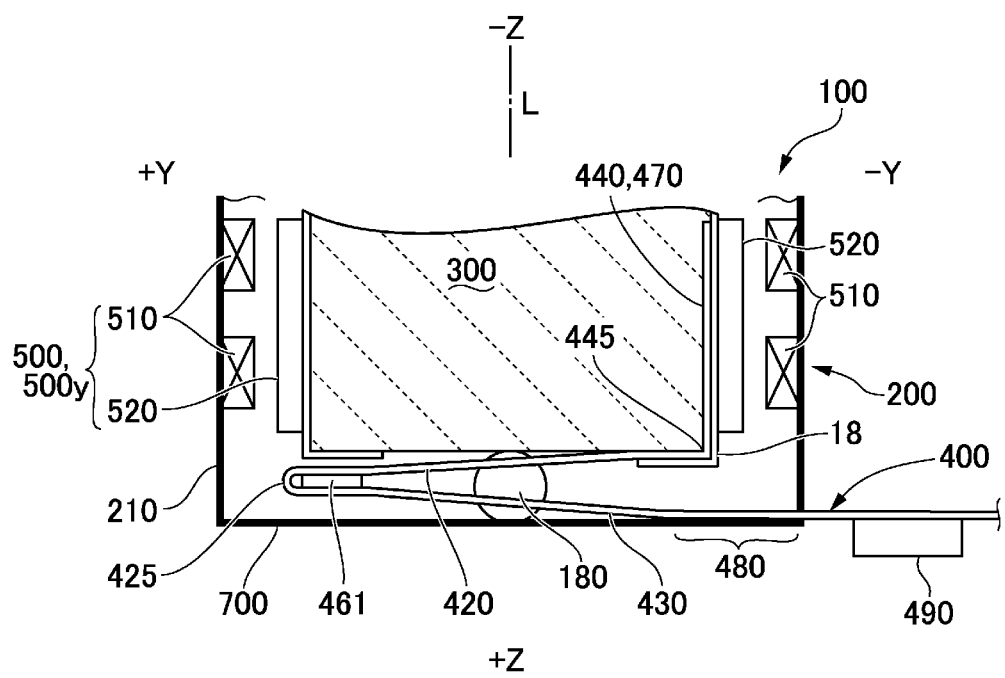
FIG. 9 is an explanatory view showing a state in which a flexible circuit board is mounted in an optical unit with a shake correcting function in accordance with a fourth embodiment of the present invention.
Figure 10A:
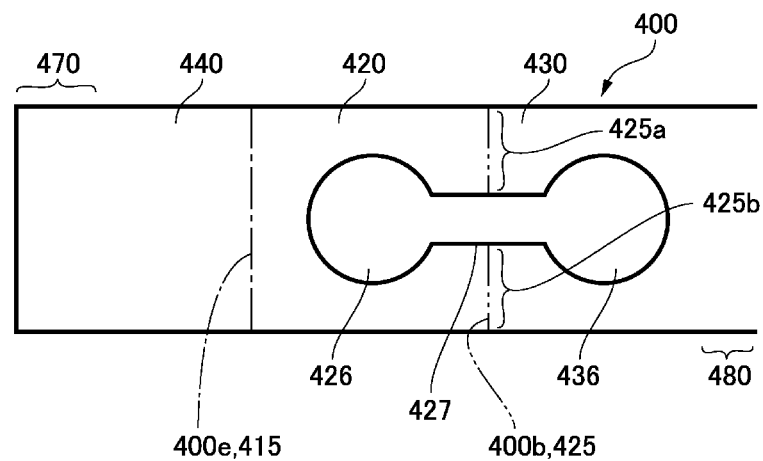
FIGS. 10(a) and 10(b) are explanatory views showing the flexible circuit board which is used in the optical unit with a shake correcting function in accordance with the fourth embodiment of the present invention.
Figure 10B:
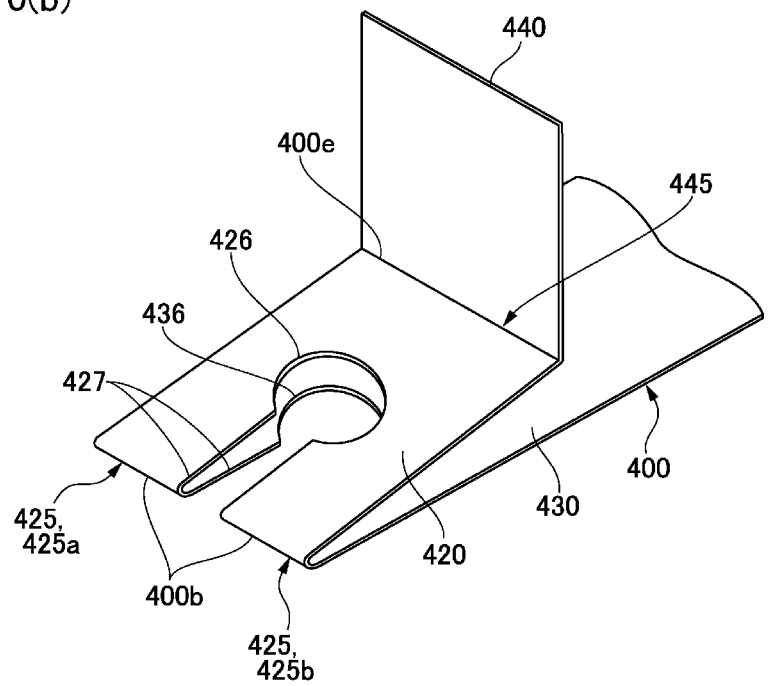

FIG. 9 is an explanatory view showing a state in which a flexible circuit board 400 is mounted in an optical unit 100 with a shake correcting function in accordance with a fourth embodiment of the present invention. FIGS. 10(a) and 10(b) are explanatory views showing the flexible circuit board 400 which is used in the optical unit 100 with a shake correcting function in accordance with the fourth embodiment of the present invention. FIG. 10(a) is a plan view showing a state in which the flexible circuit board 400 is developed and FIG. 10(b) is a perspective view showing a state in which the flexible circuit board 400 is bent. In FIG. 10(a), a ridge-folding part of the flexible circuit board 400 is indicated by an alternate long and short dash line and a valley-folding part is indicated by a two-dot chain line.

As shown in FIG. 9 and FIGS. 10(a) and 10(b), in the optical unit 100 in this embodiment, the flexible circuit board 400 is provided at a position on one side in the optical axis direction (one side "+Z" in the "Z" direction) with respect to the movable module 300 so as to superpose on the movable module 300. The flexible circuit board 400 is provided with a bent portion 445 which is bent at 90 degrees at its midway portion in an extended direction and a folded-back portion 425 whose extended direction is reversed at its another midway portion. Specifically, in the flexible circuit board 400, the bent portion 445 is formed by bending at 90° in the ridge-folding part 400e provided at a midway portion in the extended direction, and the folded-back portion 425 is formed by bending in the valley-folding part 400b at a position which is separated from the ridge-folding part 400e in the extended direction. As a result, the flexible circuit board 400 is formed from the side of the movable module 300 to the outer side of the optical unit 100 with a first extended part 440, a second extended part 420 continuously connected with the first extended part 440 through the bent portion 445, and a third extended part 430 continuously connected with the second extended part 420 through the folded-back portion 425. The third extended part 430 is superposed on the second extended part 420 on one side "+Z" in the "Z" direction.

A tip end side of the first extended part 440 is utilized as a connected portion 470 with an inner side of a side face part of the movable module 300 (for example, an inner side face of the case 18), and a midway portion of the third extended part 430 is utilized as a connected portion 480 with the lower cover 700 of the fixed body 200. Therefore, the flexible circuit board 400 is structured so as to have one folded-back portion 425 whose extended direction is reversed at a midway portion from the connected portion 480 with the fixed body 200 to the connected portion 470 with the movable module 300. The folded-back portion 425 is located so as to have a space of about 1.0 mm in the optical axis direction between the folded-back portion 425 and the movable module 300 and between the folded-back portion 425 and the lower cover 700 of the fixed body 200.

In this embodiment, the second extended part 420 and the third extended part 430 of the flexible circuit board 400 are located between the movable module 300 and the lower cover 700 of the fixed body 200, and a swing support point 180 for swinging the movable module 300 is provided between the movable module 300 and the lower cover 700 of the fixed body 200. Therefore, in this embodiment, as shown in FIGS. 10(a) and 10(b), the second extended part 420 and the third extended part 430 of the flexible circuit board 400 are formed with holes 426 and 436 at positions superposed on the swing support point 180. Therefore, the swing support point 180 is provided between the movable module 300 and the lower cover 700 of the fixed body 200 without contacting with the flexible circuit board 400.

Further, in the flexible circuit board 400, the second extended part 420 and the third extended part 430 are formed with a groove 427 connecting the holes 426 and 436 with each other. Therefore, the folded-back portion 425 of the flexible circuit board 400 is divided into the first folded-back portion 425a and the second folded-back portion 425b in a direction intersecting an extended direction of the flexible circuit board 400 so as to be extended on both sides of the swing support point 180.

In the optical unit 100 structured as described above, portions of the folded-back portion 425 where the flexible circuit board 400 is superposed on each other are fixed to each other. Specifically, as described with reference to FIG. 5(b) in the first embodiment, in the portions 421 and 431 of the folded-back portion 425 where the flexible circuit board 400 is superposed on each other, faces 421a and 431a facing each other are fixed to each other by a joining member comprised of a thermosetting adhesive sheet 461. Therefore, even when a structure is adopted in which the flexible circuit board 400 is provided with the folded-back portion 425 and is extended so as to make a length dimension of the flexible circuit board 400 longer for weakening the rigidity and the shape restoring force of the flexible circuit board 400, the degree of bending of the folded-back portion 425 is not varied in an initial state or with a lapse of time. Accordingly, when the movable module 300 is swung for preventing a shake, an effect applied to the movable module 300 by the flexible circuit board 400 is prevented from being varied and thus, similar effects to the first embodiment are attained such that the movable module 300 is swung with a high degree of accuracy.

In accordance with an embodiment of the present invention, liquid type adhesive layer may be used as the joining member instead of using the thermosetting adhesive sheet 461 and the portions 421 and 431 superposed on each other in the folded-back portion 425 may be fixed by the adhesive layer.

Fifth Embodiment

Figure 11:
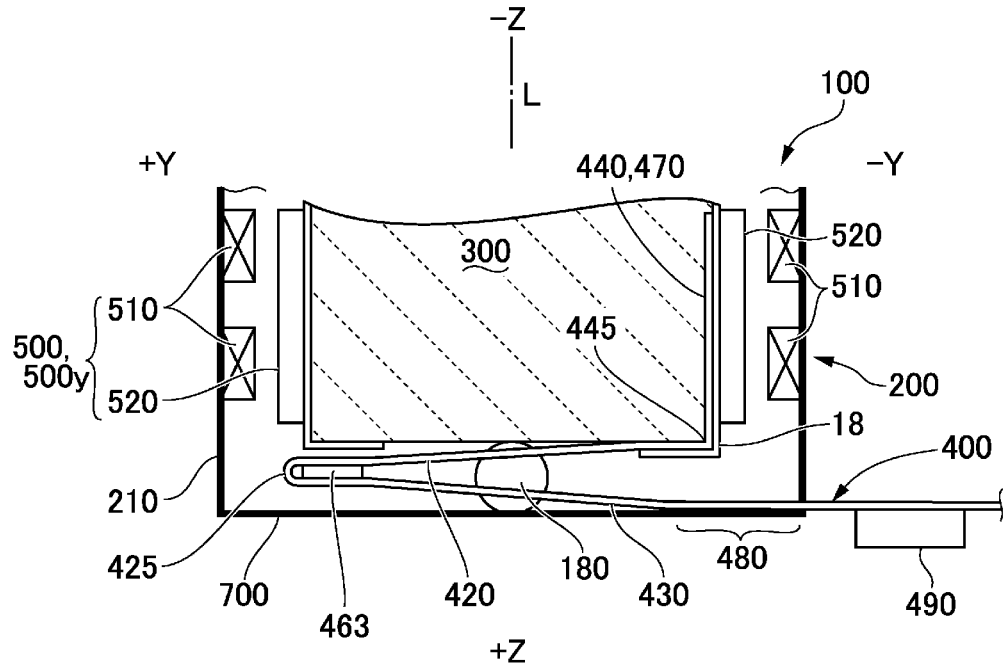
FIG. 11 is an explanatory view showing a state in which a flexible circuit board is mounted in an optical unit with a shake correcting function in accordance with a fifth embodiment of the present invention.

FIG. 11 is an explanatory view showing a state in which a flexible circuit board 400 is mounted in an optical unit 100 with a shake correcting function in accordance with a fifth embodiment of the present invention. Basic structure in this embodiment is similar to the second embodiment and thus the same reference signs are used in common portions and their descriptions are omitted.

Also in this embodiment, similarly to the fourth embodiment, the flexible circuit board 400 which is described with reference to FIGS. 10(a) and 10(b) is used. Further, in the folded-back portion 425, the portions where the flexible circuit board 400 is superposed on each other are fixed to each other. Specifically, as described with reference to FIG. 7(b) in the second embodiment, in the folded-back portion 425, faces 421a and 431a facing each other of the portions 421 and 431 of the flexible circuit board 400 which are superposed on each other are fixed to each other by solder 463 as a joining member. Therefore, for example, even when a structure is adopted in which the flexible circuit board 400 is provided with the folded-back portion 425 and is extended so as to make a length dimension of the flexible circuit board 400 longer for weakening the rigidity and the shape restoring force of the flexible circuit board 400, the degree of bending of the folded-back portion 425 is not varied in an initial state or with a lapse of time. Accordingly, similar effects to the first and the second embodiments are obtained.

Sixth Embodiment

Figure 12:
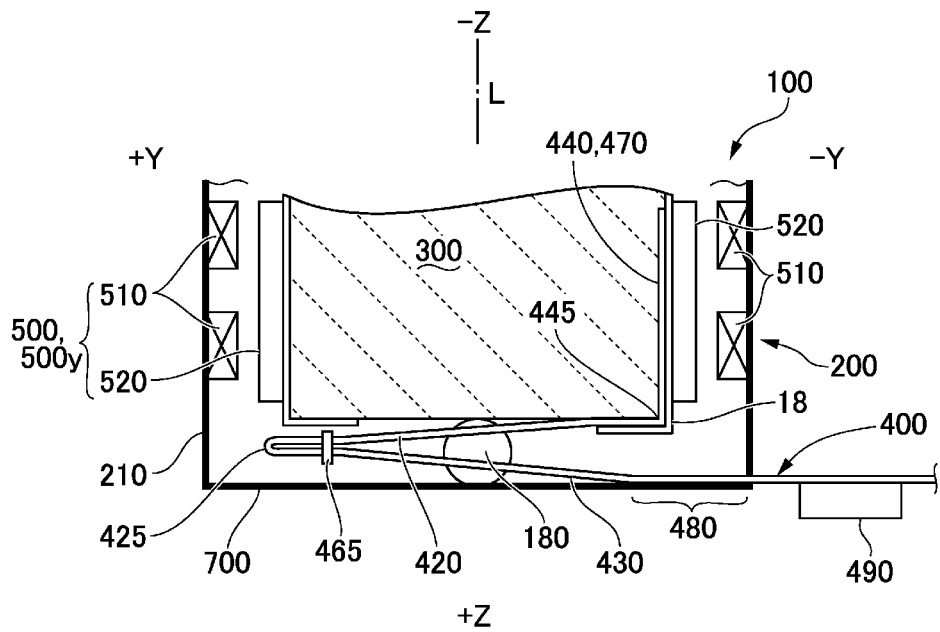
FIG. 12 is an explanatory view showing a state in which a flexible circuit board is mounted in an optical unit with a shake correcting function in accordance with a sixth embodiment of the present invention.

FIG. 12 is an explanatory view showing a state in which a flexible circuit board 400 is mounted in an optical unit 100 with a shake correcting function in accordance with a sixth embodiment of the present invention. Basic structure in this embodiment is similar to the third embodiment and thus the same reference signs are used in common portions and their descriptions are omitted.

Also in this embodiment, similarly to the fourth embodiment, the flexible circuit board 400 which is described with reference to FIGS. 10(a) and 10(b) is used. Further, in the folded-back portion 425, the portions where the flexible circuit board 400 is superposed on each other are fixed to each other. Specifically, as described with reference to FIGS. 8(b) and 8(c) in the third embodiment, the portions 421 and 431 of the folded-back portion 425 where the flexible circuit board 400 is superposed on each other are fixed by a restricting member such as a clip 465. Therefore, for example, even when a structure is adopted in which the flexible circuit board 400 is provided with the folded-back portion 425 and is extended so as to make a length dimension of the flexible circuit board 400 longer for weakening the rigidity and the shape restoring force of the flexible circuit board 400, the degree of bending of the folded-back portion 425 is not varied in an initial state or with a lapse of time. Accordingly, similar effects to the first and the third embodiments are obtained.

In accordance with an embodiment of the present invention, instead of using the clips 465 and 466, a heat-shrinkable member (heat-shrinkable tube) formed in a ring shape may be used as the restricting member for sandwiching and restricting the folded-back portions 415 and 425 from the outer side faces 412b, 422b, 421b and 431b.

Improved Examples of First Through Sixth Embodiments

Figure 13A:
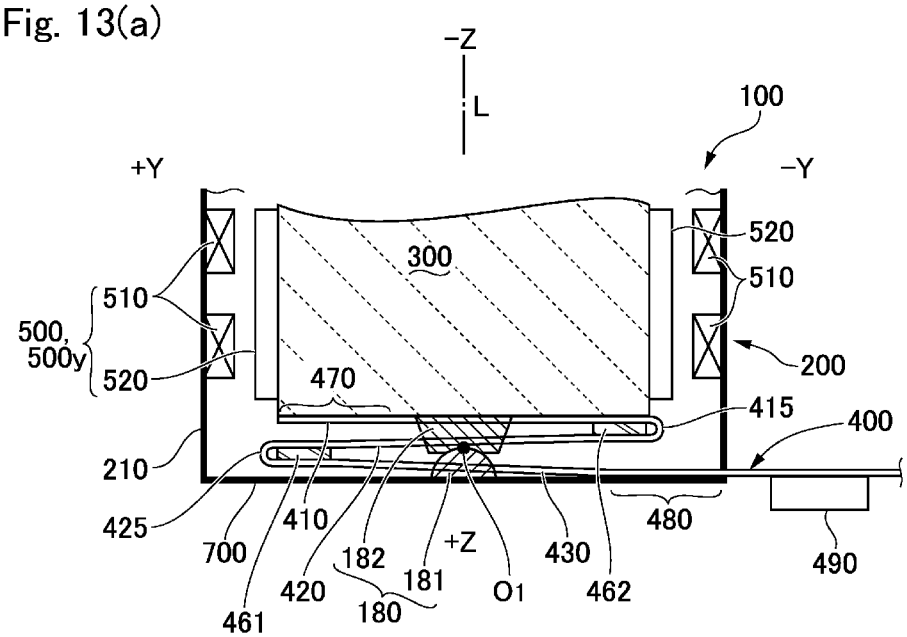
FIGS. 13(a) and 13(b) are cross-sectional views showing an optical unit with a shake correcting function in accordance with improved examples of the first through sixth embodiments of the present invention.
Figure 13B:
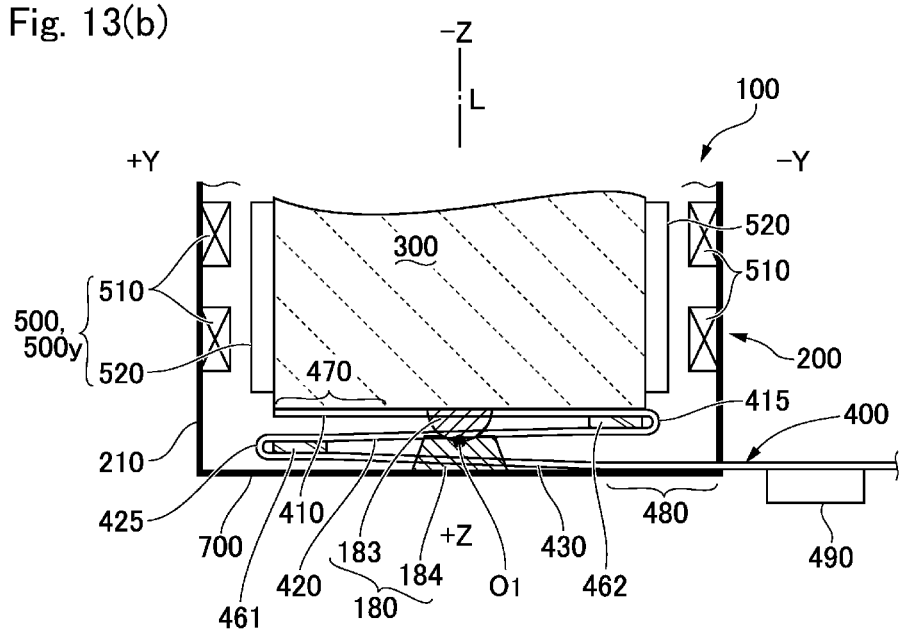

FIGS. 13(a) and 13(b) are cross-sectional views showing an optical unit 100 with a shake correcting function in accordance with improved examples of the first through the sixth embodiments of the present invention. FIG. 13(a) is a cross-sectional view showing an optical unit 100 with a shake correcting function in accordance with a first improved example for the first through the sixth embodiments of the present invention, and FIG. 13(b) is a cross-sectional view showing an optical unit 100 with a shake correcting function in accordance with a second improved example for the first through the sixth embodiments of the present invention. Basic structure in this embodiment is similar to the third embodiment and thus the same reference signs are used in common portions and their descriptions are omitted.

In the optical unit 100 with a shake correcting function in accordance with the first through the sixth embodiments, the swing support point 180 is provided on the side where the folded-back portions 415 and 425 of the flexible circuit board 400 are located. In this case, it is preferable that a height position in the optical axis direction of a swing center of the swing support point 180 is the same as a height position in the optical axis direction of the folded-back portion 415 or the folded-back portion 425.

For example, when the swing center of the swing support point 180 is set at the same height position as the bottom face of the movable module 300, a height position of the folded-back portion 415 is set to be the same as a height position of the swing center of the swing support point 180. Specifically, the above-mentioned structure is realized by utilizing a pivot bearing in which a hemispheric protruding part protruded from the lower cover 700 is abutted with the bottom face of the movable module 300. According to this structure, displacement of the folded-back portion 415 can be restrained small when the movable module 300 is swung. Therefore, an effect applied to the movable module 300 by the flexible circuit board 400 is reduced and thus the movable module 300 can be swung with a high degree of accuracy.

Further, in order to set a height position of the folded-back portion 425 to be the same as a height position of the swing center of the swing support point 180 of the movable module 300, structures shown in FIGS. 13(a) and 13(b) may be adopted.

Specifically, for example, as shown in FIG. 13(a), the swing support point 180 is structured of a hemispheric protruding part 181 which is protruded from the lower cover 700 to the movable module 300 and a receiving part 182 which is protruded from the bottom face of the movable module 300 to the lower cover 700. According to this structure, the height position of the folded-back portion 425 can be set the same height position as the swing center "O1" of the swing support point 180 of the movable module 300. Further, as shown in FIG. 13(b), the swing support point 180 may be structured of a hemispheric protruding part 183 which is protruded from the bottom face of the movable module 300 to the lower cover 700 and a receiving part 184 which is protruded from the lower cover 700 to the movable module 300. Also in this case, the height position of the folded-back portion 425 can be set the same height position as the swing center "O1" of the swing support point 180 of the movable module 300.

According to the above-mentioned structures, displacement of the folded-back portion 425 can be restrained small when the movable module 300 is swung. Therefore, an effect applied to the movable module 300 by the flexible circuit board 400 is reduced and thus the movable module 300 can be swung with a high degree of accuracy.

In FIGS. 13(a) and 13(b), the structure in the improved example is described on the basis of the first embodiment but the structure in the improved example may be applied to the structure of the second through the sixth embodiments.

Modified Examples of Second and Fifth Embodiments

Figure 14:
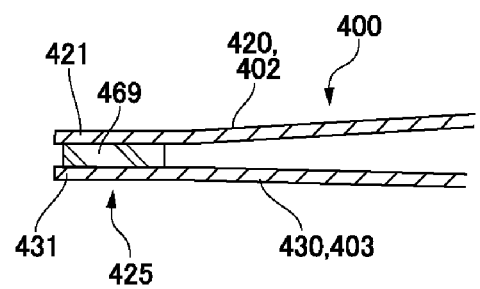
FIG. 14 is a cross-sectional view showing a folded-back portion of a flexible circuit board which is used in an optical unit with a shake correcting function in accordance with modified examples of the second and the fifth embodiments of the present invention.

FIG. 14 is a cross-sectional view showing a folded-back portion 425 of a flexible circuit board 400 which is used in an optical unit 100 with a shake correcting function in accordance with modified examples of the second and the fifth embodiments of the present invention.

In the embodiment described above, the folded-back portions 415 and 425 are structured as a bent portion of one flexible circuit board 400. However, as shown in FIG. 14, it may be structured that end parts of two pieces of flexible circuit boards 402 and 403 are fixed to each other to structure the folded-back portion 425. In this case, wiring patterns of the flexible circuit board 402 and wiring patterns of the flexible circuit board 403 are required to be electrically connected with each other in a predetermined corresponding relationship. Therefore, when anisotropic conductive material 469 is used as a joining member, wiring patterns are electrically connected with each other and the portions 421 and 431 where the flexible circuit board 400 is superposed on each other in the folded-back portion 425 are fixed to each other.

Other Embodiments

In the embodiments described above, the flexible circuit board 400 shown in FIGS. 6(a) and 6(b) and FIGS. 10(a) and 10(b) may be provided with only holes 416, 426 and 436 at the positions superposed on the swing support point 180 without providing the grooves 417 and 427.

Further, in order to fix the folded-back portions 415 and 425, both of the joining member described in the first and the second embodiments and the restricting member described in the third embodiment may be used together.

In the embodiments described above, the "X"-side movable module drive mechanism 500x and the "Y"-side movable module drive mechanism 500y are provided for the photographing unit 1. However, the present invention may be applied to an optical unit which is provided with only one of the "X"-side movable module drive mechanism 500x and the "Y"-side movable module drive mechanism 500y so that only a shake is corrected in a direction where a shake by the user is easily occurred.

In the embodiments described above, the present invention is, as an example, applied to the optical unit 100 which is used in a cell phone with a camera. However, the present invention may be applied to the optical unit 100 which is used in a thin digital camera or the like. Further, in the embodiments described above, the photographing unit 1 includes, as an example, in addition to the lens 10 and the imaging element 155, the lens drive mechanism 5 for magnetically driving the movable body 3 including the lens 10 in the optical axis "L" direction which is supported on the support body 2. However, the present invention may be applied to a fixed focus type optical unit in which the lens drive mechanism 5 is not mounted on the photographing unit 1.

In addition, other than a cell phone, a digital camera and the like, the optical unit 100 with a shake correcting function to which the present invention is applied may be fixed in an apparatus such as a refrigerator in which vibration is occurred in a certain interval and mounted so as to be capable of being remote controlled. According to the apparatus, a service can be provided in which information in the inside of the refrigerator is obtained at a visit place, for example, at the time of shopping. According to this service, the camera system is provided with an attitude stabilizing device, a stable image can be transmitted even when vibration may occur in the refrigerator. Further, this device may be fixed to a device such as a bag, a satchel or a cap of a child and a student which is carried at a time of commuting or attending school. In this case, states of surroundings are photographed at a constant interval and, when the image is transmitted to a predetermined server, the parent or the like watches the image at a remote place to secure security of the child. In this application, without conscious of a camera, a clear image is photographed even when vibration occurs at the time of moving. Further, when a GPS is mounted in addition to a camera module, the position of a target person can be obtained simultaneously and thus, when an accident occurs, its position and situation can be confirmed immediately. In addition, when the optical unit 100 with a shake correcting function to which the present invention is applied is mounted at a position which is capable of photographing toward a front side in a car, it can be used as a drive recorder. Further, it may be structured that the optical unit 100 with a shake correcting function to which the present invention is applied is mounted at a position which is capable of photographing toward a front side in a car and a front side image is photographed automatically at a constant interval and the front side image is automatically transmitted to a predetermined server. Further, when this image is distributed while interlocking with traffic jam information in the VICS (Vehicle Information and Communication System) of a car navigation system, the situation of a traffic jam can be provided further in detail. According to this service, similarly to a drive recorder mounted on a car, the situation when an accident has occurred can be recorded by a third person of passer-by without intention to utilize an inspection of the situation. Further, a clear image can be acquired without affected by vibration of a car. In a case of the application, when a power supply is turned on, a command signal is outputted to the control section and the shake control is started on the basis of the command signal.

Further, the optical unit 100 with a shake correcting function to which the present invention is applied may be applied to shake correction of an optical device from which a light beam is emitted such as a laser beam pointer, a portable or on-vehicle projection display device and direct viewing type display device. Further, in observation with high magnification such as an astronomical telescope system or a binocular system, the optical unit 100 may be used to observe without using an auxiliary locking device such as three-legged supports. In addition, when the present invention is applied to a rifle or a turret of a tank, its attitude can be stabilized against vibration at the time of trigger and thus hitting accuracy can be enhanced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. An optical unit with a shake correcting function comprising:
   a fixed body;
   a movable module which holds an optical element;
   a flexible circuit board which is connected with the movable module and the fixed body; and
   a movable module drive mechanism for shake correction which swings the movable module with respect to the fixed body;
   wherein the flexible circuit board is formed in a Z character shape, the flexible circuit board comprising:
      a first connected portion connected with the movable module;
      a first extended part, a first end of the first extended part being connected to the first connected portion;
      a first folded-back portion continuously connected to a second end of the first extended part, wherein the flexible circuit board becomes folded back under the first extended part at the first folded-back portion;
      a second extended part, a first end of the second extended part being continuously connected to the first folded-back portion;
      a second folded-back portion continuously connected to a second end of the second extended part, wherein the flexible circuit board becomes folded back under the second extended part at the second folded-back portion;
      a third extended part, a first end of the third extended part being continuously connected to the second folded-back portion; and
      a second connection portion connected to the fixed body, wherein the second connected portion is connected to a second end of the third extended part;
   wherein portions of the first folded-back portion which are superposed on each other are fixed to each other;
   wherein portions of the second folded-back portion which are superposed on each other are fixed to each other;
   wherein a swing support point structured to swing the movable module, the swing support point is provided between the fixed body and the movable module on a side where the flexible circuit board is provided;
   wherein the first connected portion is disposed to a first side of the swing support point in a first direction perpendicular to an optical axis direction;
   wherein the second connected portion is disposed to a second side of the swing support point in a second direction perpendicular to an optical axis direction and opposite to the first direction;
   wherein the first folded-back portion is disposed to the second side of the swing support point in the second direction;
   wherein the second folded-back portion is disposed to the first side of the swing support point in the first direction;
   wherein a first space is provided between the first folded back portion and the movable body in the optical axis direction;
   wherein a second space is provided between the second folded back portion and the fixed body in the optical axis direction; and
   wherein the second folded-back portion and a swing center of the swing support point are located at a same position in the optical axis direction.

2. The optical unit with a shake correcting function according to claim 1, wherein the portions of the first and second folded-back portions which are superposed on each other are fixed to each other by a joining member which joins faces facing each other of the first and second folded-back portions.

3. The optical unit with a shake correcting function according to claim 2, wherein the joining member is a thermosetting adhesive sheet.

4. The optical unit with a shake correcting function according to claim 2, wherein the joining member is solder for joining metal patterns which are formed on faces facing each other of the first and second folded-back portions.

5. The optical unit with a shake correcting function according to claim 1, wherein the portions of the first and second folded-back portions which are superposed on each other are fixed to each other by a restricting member which sandwiches and restricts the first and second folded-back portions from their outer sides.

6. The optical unit with a shake correcting function according to claim 5, wherein the restricting member is a clip which is provided with a hole into which the first and second folded-back portions are inserted.

7. The optical unit with a shake correcting function according to claim 5, wherein the restricting member is a heat-shrinkable member formed in a ring shape into which the first and second folded-back portions is inserted.

8. The optical unit with a shake correcting function according to claim 1, wherein the first and second folded-back portions are divided in a direction intersecting an extended direction of the flexible circuit board so as to be extended on both sides of the swing support point.

9. The optical unit with a shake correcting function according to claim 1, wherein the portions of the first and second folded-back portions which are superposed on each other are fixed to each other by a joining member which joins faces facing each other of the first and second folded-back portions.

10. The optical unit with a shake correcting function according to claim 1, wherein the portions of the first and second folded-back portions which are superposed on each other are fixed to each other by a restricting member which sandwiches and restricts the first and second folded-back portions from their outer sides.

* * * * *